US005581674A

United States Patent [19]
Itoh

[11] Patent Number: 5,581,674
[45] Date of Patent: Dec. 3, 1996

[54] IMAGE DISPLAYING SYSTEM FOR EFFICIENTLY STORING IMAGES HAVING DIFFERENT LUMINANCE LEVELS FOR USE IN A GRAPHIC DISPLAY SYSTEM

[75] Inventor: Yasunari Itoh, Yamato, Japan

[73] Assignee: PFU Limited, Ishikawa, Japan

[21] Appl. No.: 104,089

[22] PCT Filed: Dec. 18, 1992

[86] PCT No.: PCT/JP92/01648

§ 371 Date: Aug. 13, 1993

§ 102(e) Date: Aug. 13, 1993

[87] PCT Pub. No.: WO93/13490

PCT Pub. Date: Jul. 18, 1993

[30] Foreign Application Priority Data

Dec. 20, 1991 [JP] Japan ..................................... 3-337435

[51] Int. Cl.$^6$ ................................................. G06T 15/50
[52] U.S. Cl. ............................................. 395/129; 395/507
[58] Field of Search .................................... 395/119, 121, 395/127, 130, 132, 126, 131, 164; 358/11; 382/166, 244

[56] References Cited

U.S. PATENT DOCUMENTS 5,029,225  7/1991  Ueda ......................................... 382/28
5,070,394  12/1991  Kobayashi ................................. 358/11

OTHER PUBLICATIONS

Pratt, William, "Digital Image Processing", *John Wiley and Sons*, 2ed, 1991, pp. 597–611.
Foley, James D., et al, *Computer Graphics: Principles and Practices*, Addison–Wesley Publishing Co., 2nd ed., 1990, pp. 598–600 and 734–741.

Primary Examiner—Mark K. Zimmerman
Assistant Examiner—Rudolph Buchel
Attorney, Agent, or Firm—Staas & Halsey

[57] ABSTRACT

A graphic display system including a display unit, a main memory for storing graphic data, and a controller for controlling the processing and transferring of data between the display unit and the memory. The main memory has an image data region for storing graphic data as a set of unit images. Each unit image is defined by two sides that include two contour lines having the same luminance and another two sides each connecting the ends of the two contour lines. The main memory also includes an interpolation region for storing data for interpolating the luminance of each of the unit images, and a transformation region for storing data for transforming the coordinates of a vertex of each of the unit images in order to transform the unit image. When displaying an image on the display unit, data is read out of the interpolation region and each of the unit images is interpolated by gradually increasing the luminance thereof from one contour line toward the other according to the data. At the same time, data is read out of the transformation region, and the coordinates of a vertex of each unit image are shifted according to a transformation formula in order to transform the unit image.

5 Claims, 9 Drawing Sheets

IMAGE DISPLAYING SYSTEM FOR EFFICIENTLY STORING IMAGES HAVING DIFFERENT LUMINANCE LEVELS FOR USE IN A GRAPHIC DISPLAY SYSTEM

FIELD OF THE INVENTION

The present invention relates to an image display system for use in a graphic display system, and more particularly, to an image display system in for use a graphic display system in which images having different luminance levels are stored in a main memory and in which such images are displayed on a graphic display.

DESCRIPTION OF THE RELATED ART

Computer graphic display systems are used in various fields. These graphic display systems typically employ a CPU serving as a control unit to provide and process various instructions, an image memory (VRAM) for temporarily storing image data, a main memory for storing image data and other data, a CRT serving as a display unit, and an input device such as a keyboard and a mouse.

When displaying images, it is necessary to store a large quantity of image data in a minimum space in the main memory, and to effectively use the capacity of the main memory. It is also necessary to provide a method of reading the stored images, speedily displaying them on the display unit, and transforming the images as required at high to other devices.

SUMMARY OF THE INVENTION

An object of the present invention is to provide an image display system for use in a graphic display system that stores a luminance-position distribution of image data according to the shape of an image in a minimum memory space, and displays and transforms the image at high speed.

An object of the present invention is to provide an image display system that stores a luminance-position distribution according to the shape of an image in a minimum memory space, and displays and transforms the image at high speed.

According to the present invention, a graphic display system includes a display unit, a main memory 3 for storing graphic data, and a controller 3 for controlling the processing and transferring of data between the display unit and the memory.

The main memory includes: an image
  data region for storing graphic data as a set of unit images each defined by two sides that are two contour lines having the same luminance and another two sides connecting the ends of the contour lines. The main memory also includes an interpolation region for storing data for interpolating the luminance of each of the unit images a transformation and
  a transformation region for storing data for transforming the coordinates of a vertex of each of the unit images so as to provide a transformed image.

When displaying an image on the display unit, data is read out of the interpolation region and each of the unit images is interpolated by gradually increasing the luminance thereof from one contour line toward the other according to the data. At the same time, data is read out of the transformation region, and the coordinates of a vertex of each unit image are shifted according to a transformation formula, to transform the unit image.

Each of the unit images is a triangle or a quadrangle. Interpolation by gradually increasing of the luminance of each unit image from one contour line toward the other is carried out using dither patterns. Transformation formulae used for transforming an image are linear transformation operators based on a matrix.

DETAILED DESCRIPTION OF THE PREFERRED EMBODIMENTS

Before explaining embodiments of the present invention, a prior art and the problems thereof will be explained with reference to the drawings.

Figure 1:
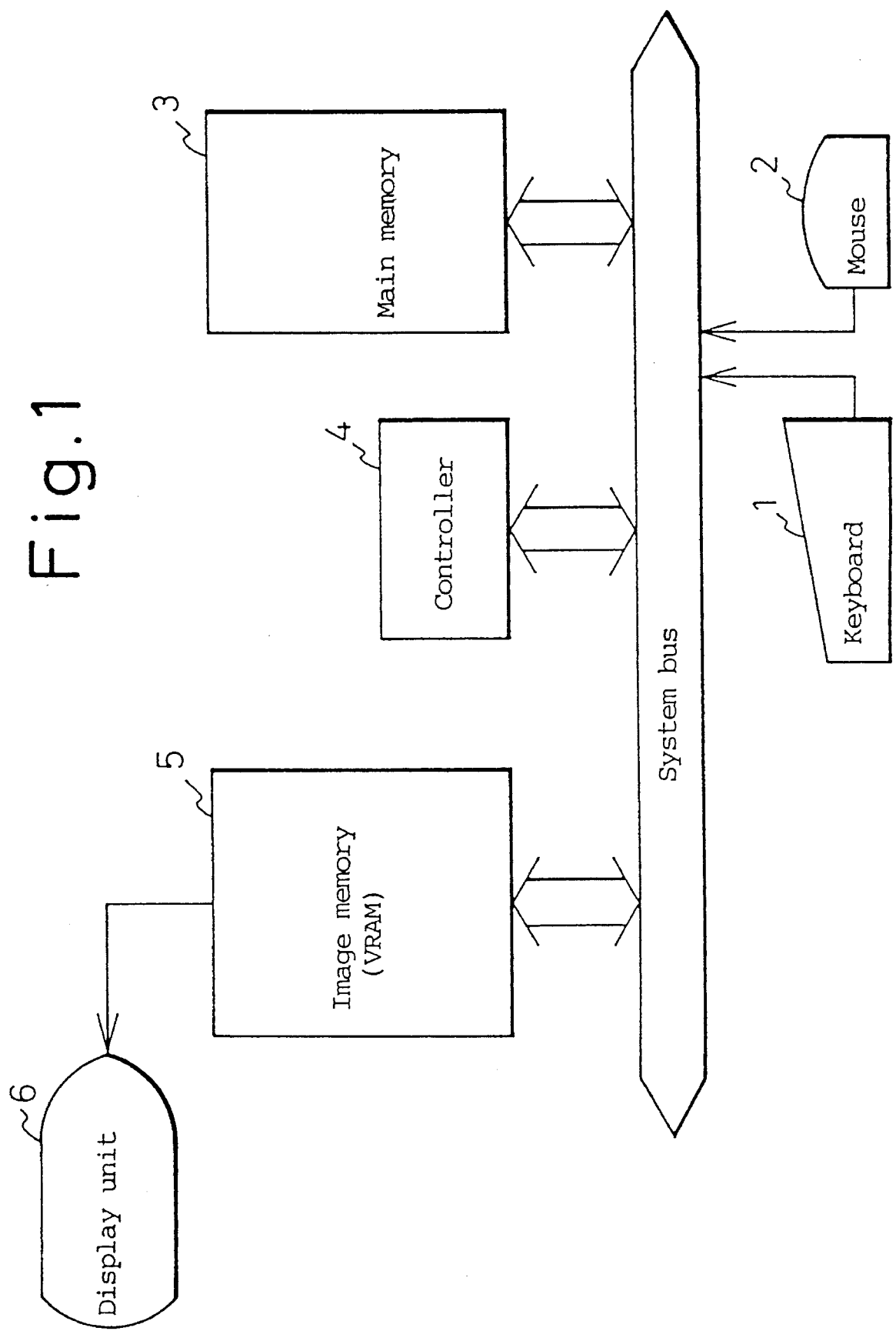
FIG. 1 shows essential parts of a standard graphic display system according to the prior art.

FIG. 1 shows the essential parts of a graphic display system according to the prior art identities. Numeral 1 a keyboard and numeral identities 2 a mouse. These input devices are used by an operator to enter instructions and data. Other input and pointing devices are also employable.

Main memory 3 stored red (R), green (G) and blue (B) image data, etc. Controller 4 controls the reading of data out of main memory 3, the writing of data to main memory 3, and the transferring of data between main memory 3 and a display unit 6. Image memory 5 is a standard VRAM used to display image data on display unit 6. These aforementioned components are connected to one another through a system bus which is used to transfer instructions and data in a conventional way.

Figure 2:
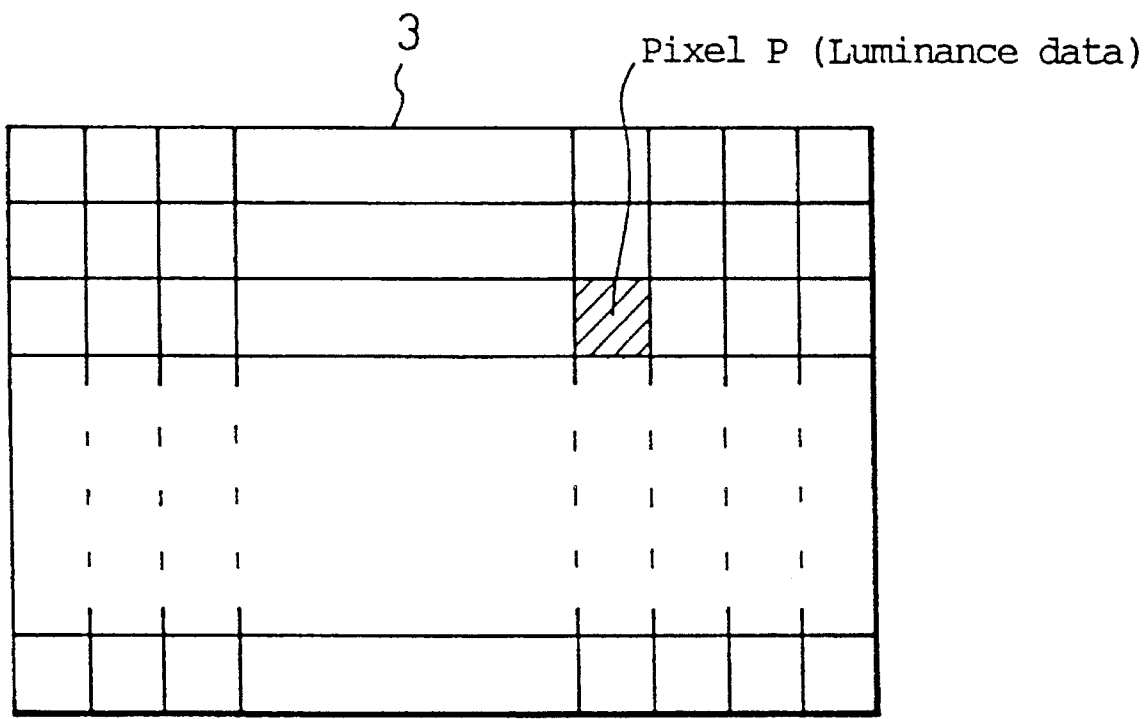
FIG. 2 explains a matrix of pixels in a main memory.

FIG. 2 shows a matrix of pixels in main memory 3. Each pixel P has luminance data. When storing changes in the luminance of an image in the main memory, each of the pixels P in the matrix is provided with color and luminance data corresponding to the image. To transform a displayed image, it is necessary to calculate a new position for every pixel of the image.

Figure 3:
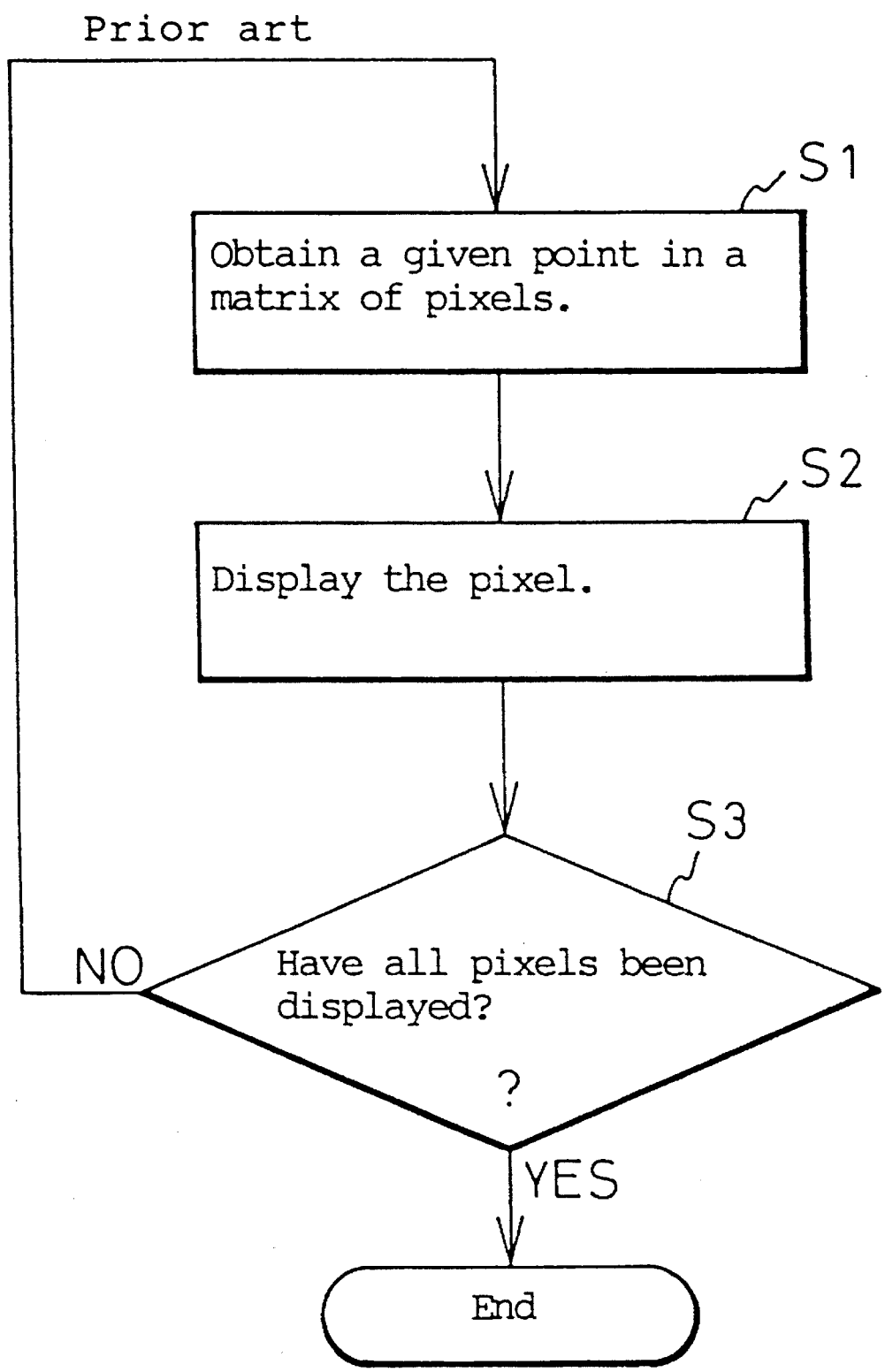
FIG. 3 is a flowchart which shows image data processes according to the prior art.

FIG. 3 is a flowchart which shows processes carried out by the structure depicted in FIG. 1 and according to the prior art. Step S1 specifies a pixel P in the matrix of pixels of FIG. 2. Step S2 reads the pixel P, calculates the luminance of the pixel, and displays the pixel on display unit 6. These steps are repeated on the matrix of pixels, and step S3 determines whether or not all pixels have been displayed. If there is any pixel to be displayed, the process is repeated beginning again from step S1.

According to the method depicted in FIG. 2, the luminance of every pixel must be stored in the main memory. Accordingly, the main memory must have a large capacity. When transforming a displayed image, the position of every pixel in the image must be calculated. Namely, complicated calculations are required. When the image to be displayed is a three-dimensional image, the skill of an operator must be increased to handle the complicated interpolation calculations. In this way, the transformation according to the prior art involves a large number of transformation calculations, and accordingly, the speed of transformation is slow.

Figure 4:
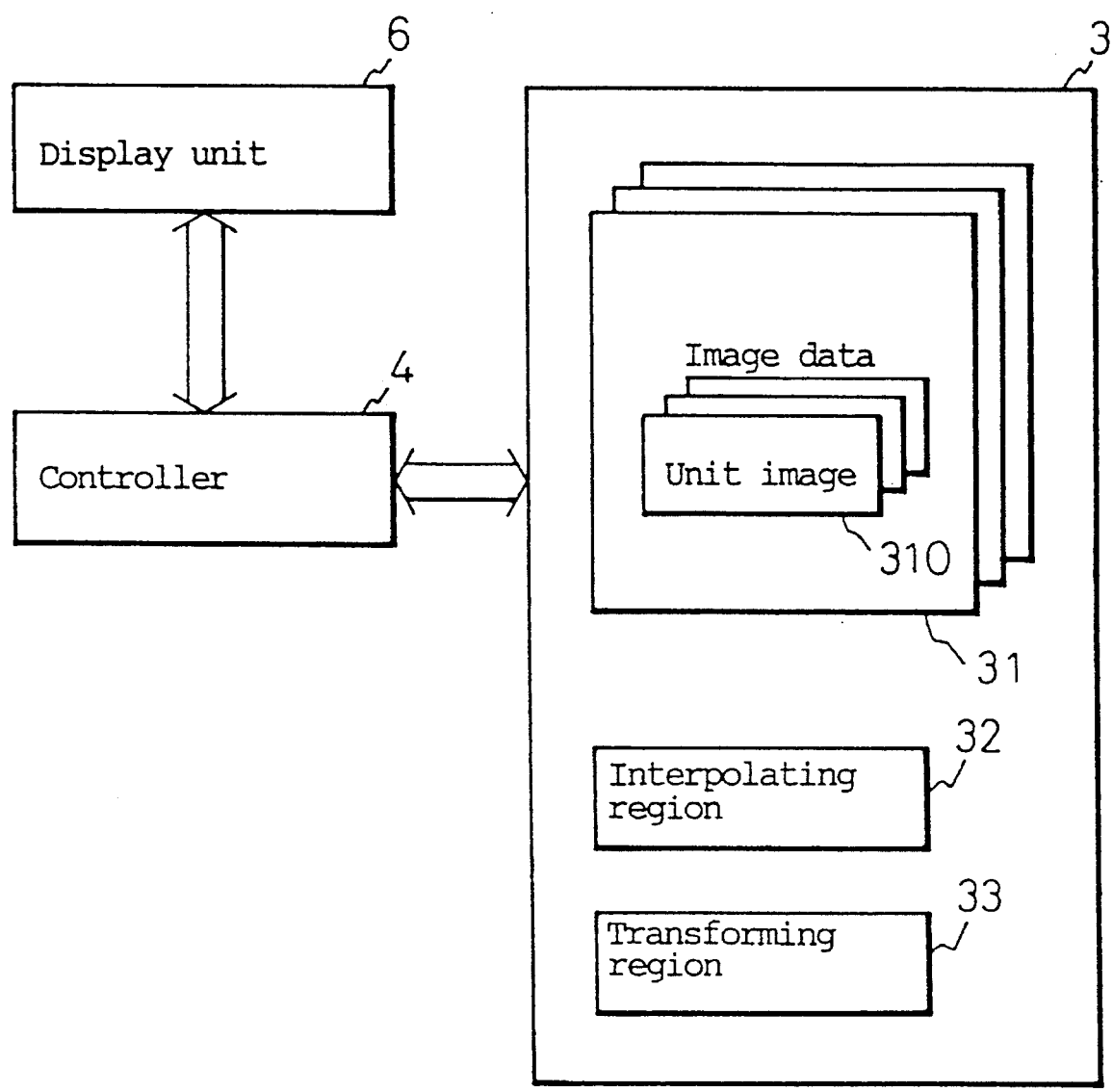
FIG. 4 shows essential parts of a main memory according to the present invention.

FIG. 4 shows essential parts of a main memory according to the present invention. The main memory 3 has an image data region 31 for storing the luminance of each area or pixel of an image. The image data region 31 includes a plurality of unit image regions 310 each storing a rectangular unit image defined by two contour lines each connecting the same luminance and two sides that connect ends of the two contour lines.

Main memory 3 further includes an interpolation region 32 for holding data for interpolating luminance inside the unit image region 310, and a transformation region 33 for storing data for transforming the coordinates of a vertex of each image region 310 in the image data region 31, so as to transform the image.

As will be explained later in detail, the present invention stores, in main memory 3, the luminance data of each pixel as luminance contour line data, and displays an image by interpolating the luminance of an area between contour lines. Accordingly, the present invention is able to store an images in a minimum memory space and to display and to transforms the image at high speed.

Referring again to FIG. 4, the controller 4 interpolates the inside of each of the unit image regions 310 according to data in the interpolation region 32 when displaying the luminance of each position of an image held in the image data region 31 in order to prepare an image having a three-dimensional effect or gradation with a small quantity of data. Data in the transformation region 33 is used to transform an image at high speed.

Figure 5:
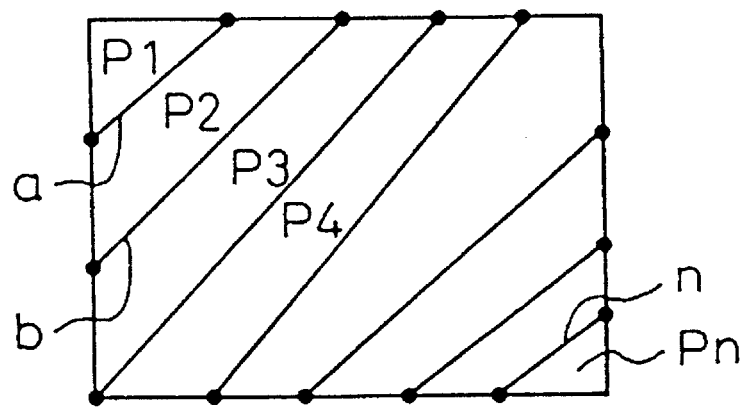
FIG. 5 explains luminance contour lines according to the present invention.

Referring now to FIG. 5, therein depicted are explains luminance contour lines according to the present invention. In the image, marks "a" to "n" are contour lines each connecting the same luminance, and P1 to Pn are unit images each defined by the contour lines and two sides.

Figure 6:
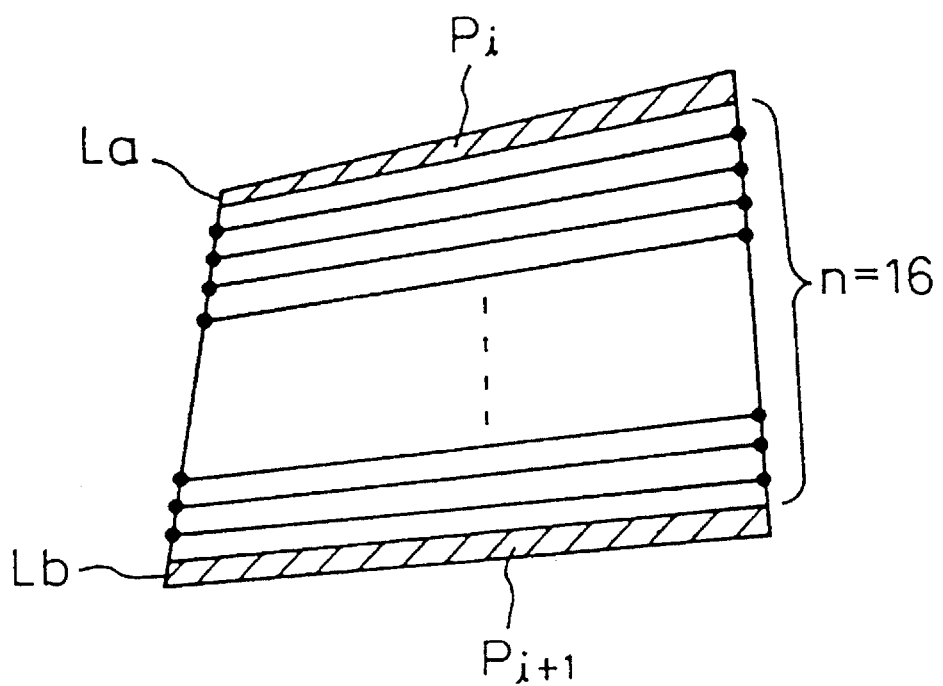
FIG. 6 explains one of the unit images shown in FIG. 6 as divided into sections.

Referring now to FIG. 6 therein depicted is shows one of the unit images of FIG. 5, divided into small sections. An area between contour regions Pi and Pi+1 is divided into n sections for interpolation purpose. For example, the area is divided into 16 sections and interpolated with 4×4 dither patterns which will be explained below with reference to FIG. 8.

Figure 8:
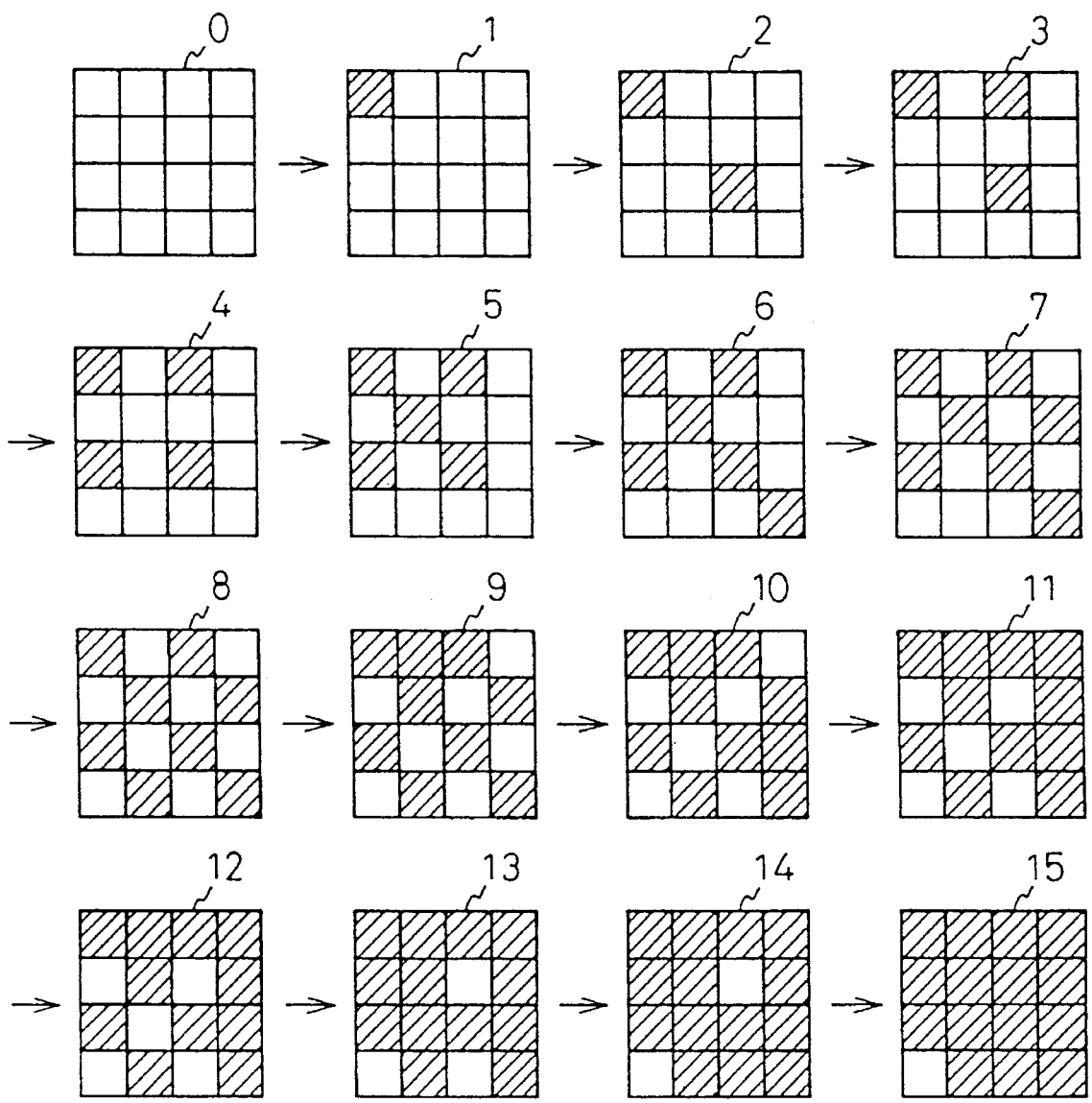
FIG. 8 which shows the examples for dither patterns used for interpolation.

Two pixels having luminance levels that correspond to the luminance levels La and Lb of the contour regions Pi and Pi+1 are prepared. These two pixels are mixed by gradually increasing a mixing ratio of the two pixels in order to prepare dither patterns. For example, as shown in FIG. 8, dot matrices 0 to 15 for 16 intensity levels are prepared according to Bayer matrices, and a specified plane is colored with matrices according to mixing ratios of luminance levels $1a$ and $1b$.

Figure 7:
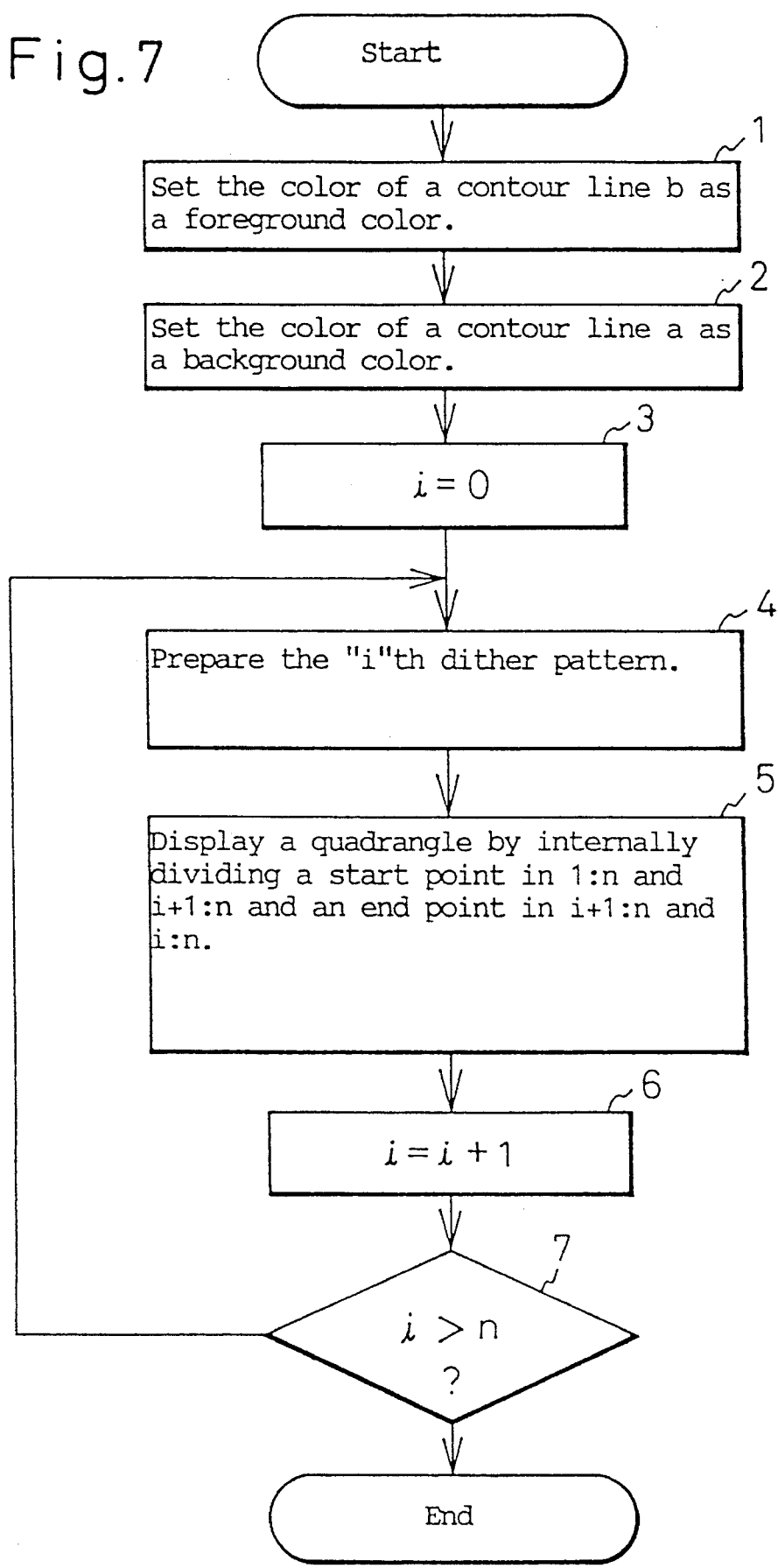
FIG. 7 is a flowchart showing processes of painting an image.

Referring now to FIG. 7 therein depicted is is a flowchart which shows the process of coloring a region. Step 1 sets the color of a contour line b as a foreground color (i.e., a darker color). Step 2 sets the color of a contour line a as a background color (e.g. a lighter color). Step 3 sets i=0. Step 4 selects an "i"th dither pattern among the patterns shown in FIG. 8. Step S5 internally divides a start point in i:n and i+1:n, and an end point in i+1:n and i:n. Step 6 sets i=i+1. Step 7 determines whether or not i>n. If i>n, flow returns to step 4.

Referring again to FIG. 8, therein depicted are shows examples of dither patterns used for interpolation purposes. There are 16 dither patterns 0 to 15. These patterns are Bayer patterns. The patterns are formed so that a mixing ratio of the foreground color (e.g., black) and background color (e.g. white) gradually changes from the pattern 0 toward the pattern 15, i.e., from the background color toward the foreground color. In particular, the patterns are prepared such that a mixing ratio of black and white (i.e. luminance levels) changes from the background color toward the foreground color.

The dither pattern 0 corresponds to the background color (white), and the dither pattern 15 corresponds to the foreground color (black).

Figure 9:
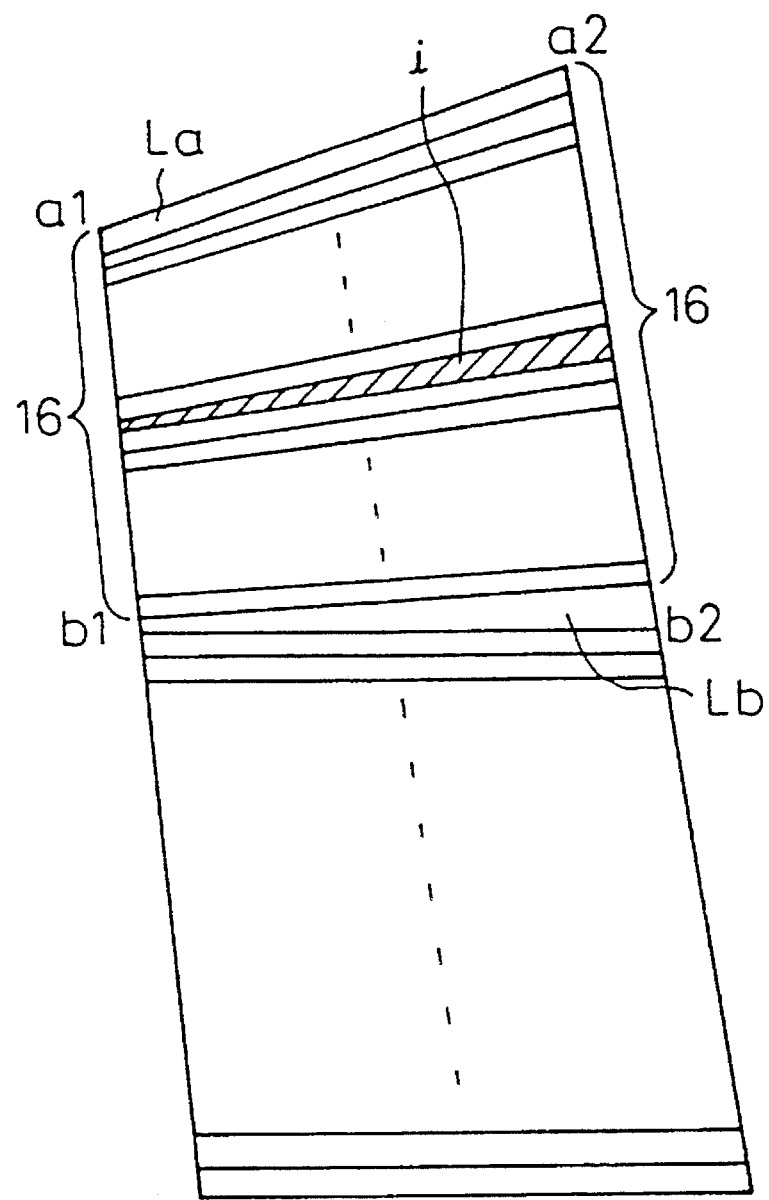
FIG. 9 shows a region divided into sections.

Referring now to FIG. 9, therein depicted is a divided region. A unit image (i.e. quadrangle) is defined by a segment a1-a2 having a luminance level La and a segment b1-b2 having a luminance level Lb. This unit image is painted with the 16 dither patterns shown in FIG. 8. At first, a section between the a1 and b1 and a section between the a2 and b2 is divided into 16 parts. Then, a hatched "i"th quadrangle is defined with the following four points:

$$a1+i(b1-a1)/16$$

$$a2+i(b2-a2)/16$$

$$a1+(i+1)(b1-a1)/16$$

$$a2+(i+1)(b2-a2)/16$$

This quadrangle is sequentially painted with the dither patterns i (i=0 to 15) shown in FIG. 8. The luminance level La is painted with the background color (e.g. white), and the luminance level Lb is painted with the foreground color (e.g., black).

Figure 10:
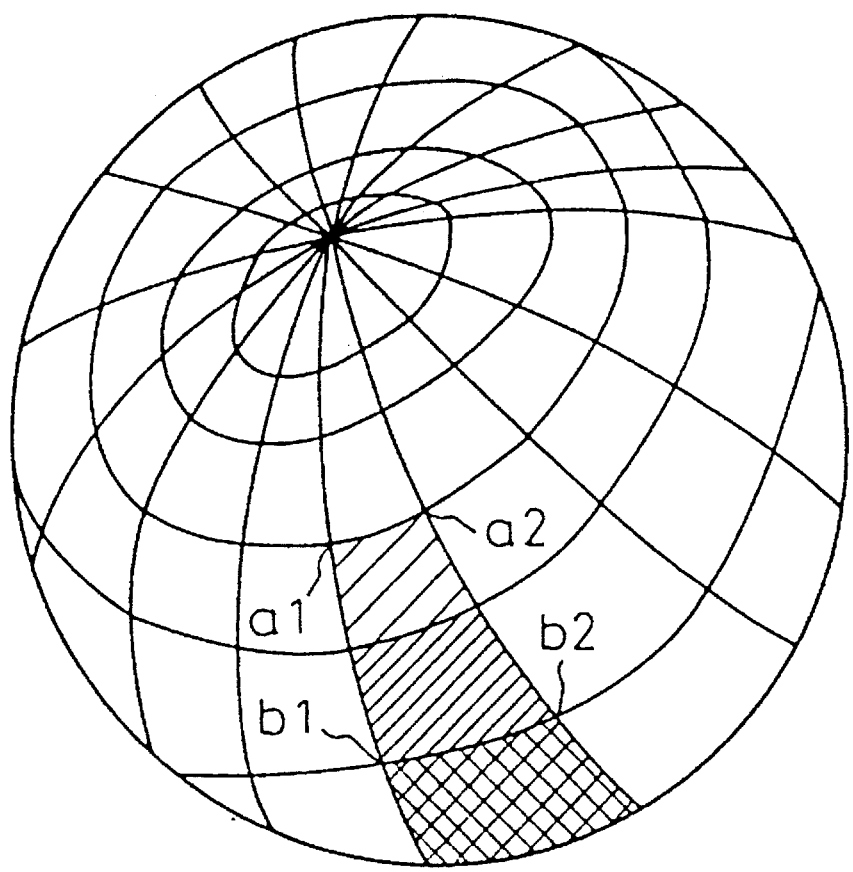
FIG. 10 explains transformation of an image.

Referring now to FIG. 10, therein depicted is a diagram which is presented to explain the transformation of an image. Each hatched area in the image corresponds to the region shown in FIG. 9. A pseudo sphere i.e., the drawing of FIG. 10, is formed of 33 unit images. This pseudo sphere is going to be transformed. A matrix of homogeneous linear transformation operators T=(ab0/cd0/ef1) is applied to 33 vertexes (xi, yi) of the unit images as follows:

$$(xi, yi, 1)T=(xi', yi', 1)$$

Then, the vertexes are shifted to (xi', yi'). In this way, the present invention easily transforms each of the unit images.

Unlike the prior art that employs a matrix of pixels and computes every pixel position to transform an image, the present invention simply transforms unit images according to linear transformation operators and finds positions after transformation according to very simple calculations.

As explained above, the present invention stores luminance-position data of each pixel of an image according to the shape of the image in a minimum memory space, displays the image at high speed, and transforms the image according to simple calculations.

Having fully described the present invention with reference to the drawing figures, it will be readily appreciated that many changes and modifications may be made without departing from the spirit or scope of the present invention which is defined in the appended claims and their equivalents.

I claim:

1. A graphic display system comprising:

a display unit displaying graphic images;

a main memory storing graphic data in an image data region storing information on a set of unit images, including unit images having a shape defined by two contour line segments of constant luminance and sides each connecting corresponding ends of the two contour line segments, an interpolation region storing interpolation data, and a transformation region storing transformation data; and a controller for controlling processing of the graphic data, including interpolation of luminance of the unit images and transformation of coordinates of at least one vertex of each of the unit images to transform the unit images, the interpolation data being read out of the interpolation region by said controller so that the luminance of each unit image of said set of unit images is interpolated by gradually increasing the luminance from a first contour line segment of said two contour line segments toward a second contour line segment of said two contour line segments according to the interpolation data and the transformation data is read out of the transformation region by said controller so that the coordinates of the at least one vertex of each unit image of said set of unit images are shifted according to a transformation formula based on the interpolation data prior to display on said display unit of said graphic display system.

2. The graphic display system according to claim 1, wherein said set of unit images includes at least one unit image shaped as a triangle having one side formed by one of the contour line segments.

3. The graphic display system according to claim 1, wherein interpolation is performed by said controller by gradually increasing the luminance of each unit image of said set of unit images from the first contour line segment of said two contour line segments toward the second contour line segment of said two contour line segments based on dither patterns.

4. The graphic display system according to claim 1, wherein said transformation formula is a linear transformation operation based on matrix arithmetic.

5. The graphic display system according to claim 1, wherein said shape of each unit image of said set of unit images is a quadrangle.

* * * * *

UNITED STATES PATENT AND TRADEMARK OFFICE
CERTIFICATE OF CORRECTION

PATENT NO. : 5,581,674
DATED : December 3, 1996
INVENTOR(S) : Itoh

It is certified that error appears in the above-indentified patent and that said Letters Patent is hereby corrected as shown below:

Col. 2, line 23, "showing" should be --which shows the--; "of" should be --for--;

line 38, "identities" should be deleted; "1" should be --1 identifies--;

line 39, "identities 2" should be --2 identifies--.

Col. 3, line 46, "shows" should be deleted;

line 63, "is" should be deleted.

Col 4, line 4, "i>n" should be --i≠n--;

line 6, "shows" should be deleted.

Signed and Sealed this

Twenty-second Day of April, 1997

Attest:

BRUCE LEHMAN

*Commissioner of Patents and Trademarks*

*Attesting Officer*